United States Patent
Thackston et al.

(10) Patent No.: US 11,037,264 B2
(45) Date of Patent: *Jun. 15, 2021

(54) SELECTIVE ARRIVAL NOTIFICATION SYSTEM

(71) Applicant: TOYOTA RESEARCH INSTITUTE, INC., Los Altos, CA (US)

(72) Inventors: Allison Thackston, San Jose, CA (US); Samuel Zapolsky, Mountain View, CA (US); Katarina Miller, Palo Alto, CA (US); Laura Stelzner, Mountain View, CA (US); Ron Goldman, Los Altos, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/884,989

(22) Filed: May 27, 2020

(65) Prior Publication Data

US 2020/0294175 A1 Sep. 17, 2020

Related U.S. Application Data

(63) Continuation of application No. 16/173,892, filed on Oct. 29, 2018, now Pat. No. 10,713,744.

(51) Int. Cl.
  *G08G 1/123* (2006.01)
  *G06Q 50/32* (2012.01)
  *H04L 9/32* (2006.01)

(52) U.S. Cl.
  CPC .......... *G06Q 50/32* (2013.01); *H04L 9/3213* (2013.01)

(58) Field of Classification Search
  CPC .............. G06Q 50/32; G06Q 30/0641; G06Q 30/0635; G06Q 10/083; G06Q 10/0833; H04L 9/3213; B64C 39/024; B64C 2201/146; B64C 2201/128; A61H 3/061; A61H 2003/063; A61H 2201/5048; A61H 2201/5058; A61H 2201/5071; A61H 2201/5082; A61H 2201/5089; A61H 2201/5092; H04W 4/40; H04W 4/029; H04W 4/024; G01C 21/3679; G01C 21/3476; G01C 21/3629; G01C 21/3652; G05D 1/0094; G01S 19/42
  USPC ............ 340/994, 988, 989, 991, 993, 686.1
  See application file for complete search history.

(56) References Cited

U.S. PATENT DOCUMENTS

| | | | |
|---|---|---|---|
| 10,713,744 B2 * | 7/2020 | Thackston | G06Q 50/32 |
| 2014/0201100 A1 * | 7/2014 | Rellas | G06Q 30/0607 705/330 |
| 2017/0193442 A1 * | 7/2017 | Ekkel | G06Q 50/32 |
| 2019/0279151 A1 * | 9/2019 | Felice | G06Q 10/0832 |

* cited by examiner

*Primary Examiner* — Anh V La
(74) *Attorney, Agent, or Firm* — Seyfarth Shaw LLP; Puya Partow-Navid

(57) ABSTRACT

A method for operating an arrival notification system at a location includes receiving a request to generate a notification from an arrival notification system. The method also includes receiving, in response to the request, a token. The method further includes enabling an output from a component of the arrival notification system when the token is validated.

20 Claims, 7 Drawing Sheets

SELECTIVE ARRIVAL NOTIFICATION SYSTEM

CROSS-REFERENCE TO RELATED APPLICATION

The present application is a continuation of U.S. patent application Ser. No. 16/173,892, filed on Oct. 29, 2018, and titled "SELECTIVE ARRIVAL NOTIFICATION SYSTEM," the disclosure of which is expressly incorporated by reference herein in its entirety.

BACKGROUND

Field

Certain aspects of the present disclosure generally relate to delivery systems and, more particularly, to a system and method for selective arrival notifications.

Background

Conventional physical doorbells are used to notify occupants of a house that someone is at the door. In some cases, conventional physical doorbells are misused by pranksters. For conventional physical doorbells, a prankster needs to physically press the doorbell, thereby, making it difficult for the prankster to remain anonymous. Recent technological advances have led to a need for wireless doorbells that may be activated via an electronic message.

For example, an autonomous delivery agent (e.g., robot) may need to notify the home's occupants of its arrival. The autonomous delivery agent may not be able to physically engage a conventional doorbell. Therefore, a wireless doorbell may be desirable to enable arrival notifications. Still, the wireless doorbell opens the possibility of unwanted notifications. For example, a prankster may connect to the wireless doorbell and anonymously send messages to ring the doorbell.

Furthermore, throughout the day, a delivery location may receive numerous items, such as groceries, food, and packages. The arrival of each item or delivery agent may generate a notification, such as a doorbell ring. The numerous arrival notifications may be distracting to an occupant. Still, some arrival notifications, such as hot food delivery, may be important for the occupant.

To prevent unwanted notifications, such as a notification from a prankster or an unnecessary delivery notification, it is desirable to improve wireless notification systems to selectively enable notifications.

SUMMARY

In one aspect of the present disclosure, a method for operating an arrival notification system at a location is disclosed. The method includes receiving a request to generate a notification. The method also includes receiving, in response to the request, a token. The method further includes enabling an output from a component of the arrival notification system when the token is validated.

Another aspect of the present disclosure is directed to an apparatus including means for receiving a request to generate an arrival notification. The apparatus also includes means for receiving, in response to the request, a token. The apparatus further includes means for enabling the arrival notification from a component of the arrival notification system when the token is validated.

In another aspect of the present disclosure, a non-transitory computer-readable medium with non-transitory program code recorded thereon is disclosed. The program code is for operating an arrival notification system at a location. The program code is executed by a processor and includes program code to receive a request to generate an arrival notification. The program code also includes program code to receive, in response to the request, a token. The program code further includes program code to enable the arrival notification from a component of the arrival notification system when the token is validated.

Another aspect of the present disclosure is directed to an arrival notification system at a location. The apparatus having a memory and one or more processors coupled to the memory. The processor(s) is configured to receive a request to generate an arrival notification. The processor(s) is also configured to receive, in response to the request, a token. The processor(s) is further configured to enable the arrival notification from a component of the arrival notification system when the token is validated.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
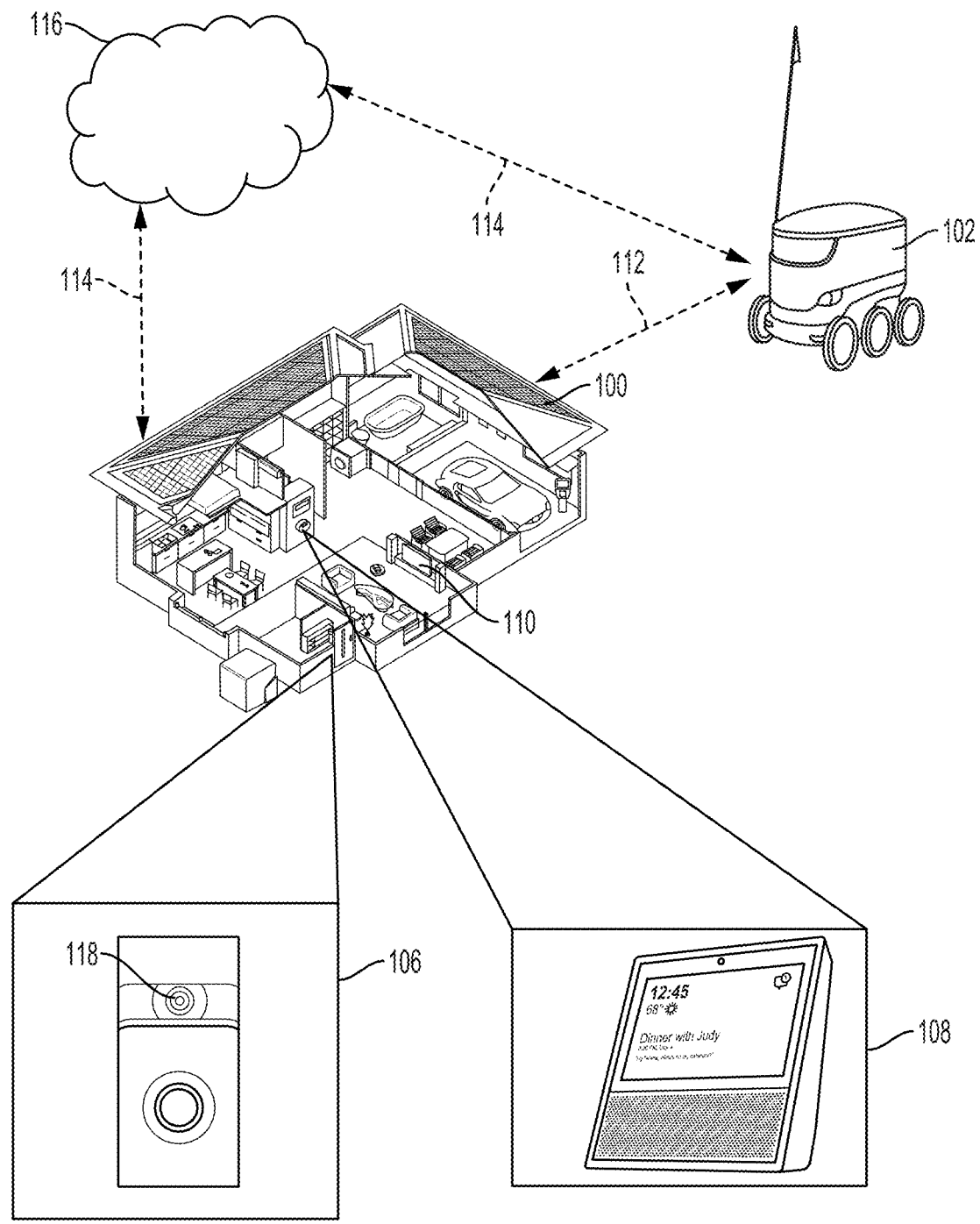
FIGS. 1A, 1B, 1C, and 1D illustrate examples of an arrival notification system according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Conventional notification systems, such as a conventional physical doorbell are used to notify occupants of a house that someone is at the door. In some cases, conventional notification systems are misused by pranksters. Still, because conventional notification systems need to by physical engaged (e.g., pushing the doorbell), it is difficult for a prankster to remain anonymous. Recent technological advances have led to a need for wireless notification systems that may be activated via an electronic message.

For example, an autonomous delivery agent (e.g., robot) may need to notify the home's occupants of its arrival. The autonomous delivery agent may not be able to physically engage a conventional notification system. Therefore, a wireless notification system may be desirable to enable arrival notifications. Still, unsecure wireless notification systems may be anonymously activated, thereby, opening the possibility of unwanted notifications. For example, a prankster may connect to a wireless doorbell and anonymously activate the doorbell. The anonymity may increase an amount of unwanted notifications.

Furthermore, throughout the day, a location may be visited by various autonomous agents. The autonomous agents, such as robots, may visit a location to deliver an item (e.g., groceries, food, packages, etc.), provide a service (e.g., gardening, housekeeping, etc.), or pick up an item (e.g., dirty laundry, packages, etc.). The arrival of each autonomous agent may generate a notification, such as a doorbell ring. The numerous arrival notifications may be distracting to an occupant. However, some arrival notifications, such as hot food delivery, may be important for the occupant.

To prevent unwanted notifications, such as a notification from a prankster or an unnecessary delivery notification, it is desirable to improve wireless notification systems to selectively enable notifications. As an example, an occupant may be sleeping when a package is delivered. In this example, the delivery arrival notification may disrupt the occupant's sleep. Therefore, the occupant may disable arrival notifications while they are sleeping.

As another example, parents may have left their children with a babysitter at home. The parents may order food to be delivered at the home. The arrival notification may be output at one or more of the home and/or the parents' mobile device. In this example, an arrival notification to the parents' mobile device may be distracting. Still, the parents may want to confirm that the food has arrived. Thus, while the parents are away from the home, the parents may authorize food arrival notifications while disabling other types of arrival notifications, such as package arrival notifications.

Aspects of the present disclosure are directed to a token-based system for authorizing activation of an arrival notification system. The token-based system issues a token to agents that are authorized to enable the arrival notification system. As such, the token-based system provides for selective arrival notifications. In the present application, an agent refers to a human or a robotic device (e.g., autonomous device or semi-autonomous device). The agents may be delivering an item, such as food, to the location or providing a service, such as house cleaning.

The arrival notification system may include one or more of a doorbell, an in-home notification system, a mobile device, or another type of system that notifies the arrival of an agent. As an example, a delivery robot may visit a house and activate the doorbell by physically pressing the doorbell. As another example, the delivery robot may wirelessly connect to a notification system to trigger an arrival notification. In yet another example, the delivery robot may send an arrival notification to a customer's mobile device.

In one configuration, upon arriving at a location, the agent may request to activate the location's arrival notification system. In response to receiving the activation request, the arrival notification system determines whether the agent is authorized to activate the arrival notification system. Specifically, the arrival notification system determines whether a token of the agent authorizes activation of the arrival notification system. If the token authorizes activation, the arrival notification system may output an audio and/or visual notification. Alternatively, if the token does not authorize activation, the arrival notification system does not generate an audio and/or visual notification. The token may be a one-time use token. Additionally, the token may be an electronic token, such as an electronic key or an encrypted electronic key.

The token may be transmitted with the activation request or in response to the activation request. For example, upon arrival, the agent may physically press the location's doorbell. In response to pressing the doorbell, the arrival notification system requests the token from the agent. The token may be provided via a wireless connection. Additionally, or alternatively, the token may be provided via a visual or audio output. For example, the agent may display an image, such as a barcode, corresponding to the token. The barcode may be scanned via a scanner, such as a doorbell video system.

In another example, upon arrival, the agent may wirelessly connect, or request a wireless connection, to the arrival notification system. A token may be transmitted during the wireless connection process. For example, the token may be transmitted with the wireless connection request. As another example, the token is transmitted in response to establishing the wireless connection.

According to an aspect of the present disclosure, the token is generated by a third party application. The token may be communicated to both the arrival notification system and the agent, such that the arrival notification system and the agent separately receive the token. In another embodiment, the arrival notification system may generate a token and transmit the token to the agent. In this configuration, the token is transmitted after an identity of the agent is verified via the arrival notification system. For example, the agent may transmit a unique identification key, such that the token is transmitted after the identity is verified.

As stated above, the agent may store supplemental information, such as identification information to identify the agent's point of origin or affiliated business (e.g., Pizza Store, U.S. Post Office, etc.). Additionally, or alternatively, the supplemental information may include parcel information to identify the parcel that is to be delivered (e.g., diapers, pizza, pet food, etc.). The supplemental information may also include information regarding the service that is to be provided (e.g., house cleaning, massage, etc.). The service may also be identified via the identification information.

The arrival notification system may receive the supplemental identification information prior to, or after, receiving the token. The arrival notification system may provide an output with the supplemental information in addition to, or alternate from, the arrival notification. For example, after receiving the supplemental information and authenticating the token, the arrival notification system may output: "Delivery robot from the pizza store has arrived with pizza."

FIG. 1A is a diagram illustrating an example of a home 100 with an arrival notification system according to aspects of the present disclosure. As shown in FIG. 1A, a robot 102 may arrive at the home 100 to deliver a parcel (not shown), perform a service, or pick up an item. The arrival location of the present disclosure is not limited to the home 100 as other types of arrival locations, such as apartments, offices, hotels, etc., are contemplated. Furthermore, the autonomous agent is not limited to the robot 102 as other types of delivery agents, such as a human or a drone, are contemplated.

The arrival notification system may include one or more components, such as a doorbell 106, an in-home digital assistant 108, lights (not shown), a television 110, and/or other components that provide an audio and/or a visual notification. The arrival notification may also include an occupant's mobile device (not shown). Upon arriving at the home 100, the robot 102 requests a notification via the arrival notification system. The request may be transmitted via a wireless connection to the arrival notification system. In response to the request, the arrival notification system determines whether one or more components 106, 108, 110 of the arrival notification system should be activated.

The robot 102 may wirelessly connect to the arrival notification system of the home 100 via a direct connection 112 or an indirect connection 114. The direct connection 112 may be a connection to the home's 100 WiFi network, a Bluetooth™ connection, a near-field communication (NFC) connection, or other type of connection. Information for the direct connection 112, such as a network ID and/or password, may be previously provided to the robot 102 by a third party or from the home 100. The indirect connection 114 may be a connection via a cloud server 116 or another type of indirect connection. The robot 102 may also physically engage a component 106, 108, 110, such as a doorbell 106, of the arrival notification system in order to request the notification.

In response to requesting a notification via the arrival notification system, the arrival notification system determines if the robot 102 is authorized to activate one or more components 106, 108, 110 of the arrival notification system. The authentication is based on a token provided by the robot 102. The token may be transmitted via the direct connection 112 or the indirect connection 114. Alternatively, the token may be provided via an image. For example, the robot 102 may display a barcode (not shown) to be scanned by a camera 118 of the doorbell 106.

The token may be authenticated by a specific component 106, 108, 110, by a computer (not shown) in the home 100, or a remote server (not shown). Upon authentication, one or more components 106, 108, 110 may generate a notification, such as an audio and/or a visual notification indicating the arrival of the robot 102. For example, an output device (e.g., buzzer, bell, speaker) associated with the doorbell 106 may ring in response to the authentication. If the token is not authenticated, a notification is not generated. The type of notification may be based on the token provided to the robot 102.

In one configuration, an occupant of the home 100 customizes notifications based on the type of delivery. For example, package deliveries may be authorized to generate a ring from the doorbell 106. As another example, the arrival of a maid may be authorized to generate the ring from the doorbell 106 and a visual output from the television 110. The customization may be based on a time of day, day of the week, type of delivery, whether the occupant is at the home 100, and/or other factors. Additionally, the robot 102 may request for a custom message to be output (e.g., visual display or audio output) with the notification. The arrival notification system determines whether the message will be output. Furthermore, the arrival notification system determines which components will output the message.

Figure 1B:
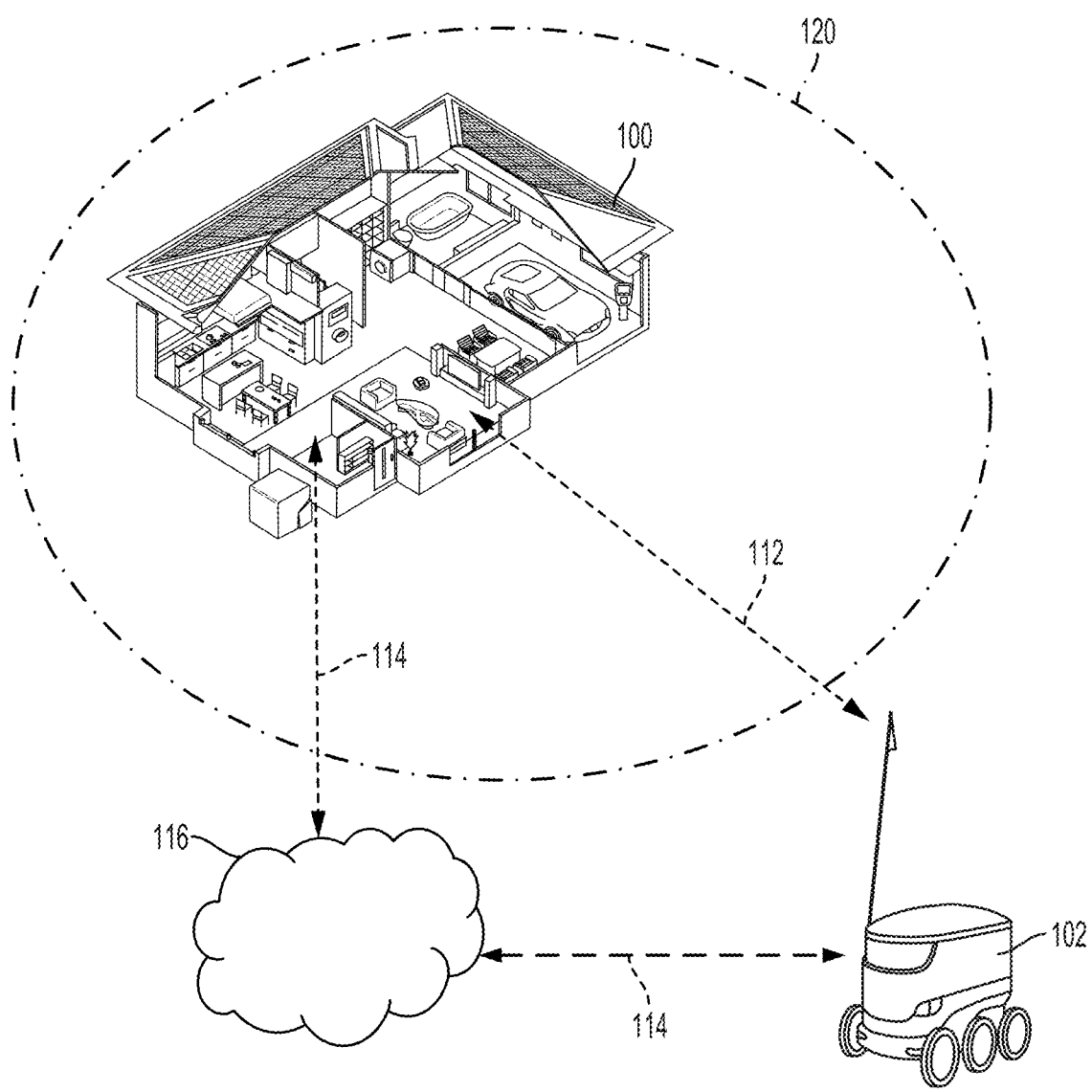

According to aspects of the present disclosure, in addition to, or alternate from activating one or more component of an arrival notification system, the token may be used to grant access to the home 100. For example, as shown in FIG. 1B, a digital perimeter 120 may be established around the home 100 to establish a "no-fly zone." That is, unless authenticated, the robot 102 may not cross a border of the digital perimeter 120.

In this configuration, the robot 102 transmits the token when the robot 102 is within range to establish the direct connection 112. If the token is authenticated, the digital perimeter 120 may be temporarily disabled to allow the robot 102 to cross the border. The robot 102 may activate the arrival notification system after crossing the border of the digital perimeter 120.

Alternatively, the robot 102 may transmit the token to the home 100 via the indirect connection 114, such that the token is authenticated prior to the robot's 102 arrival. The location of the robot 102 may be tracked via a positioning system, such as a GPS system. The digital perimeter 120 may be temporarily disabled when the robot 102 is within a certain vicinity of the home 100.

Figure 1C:
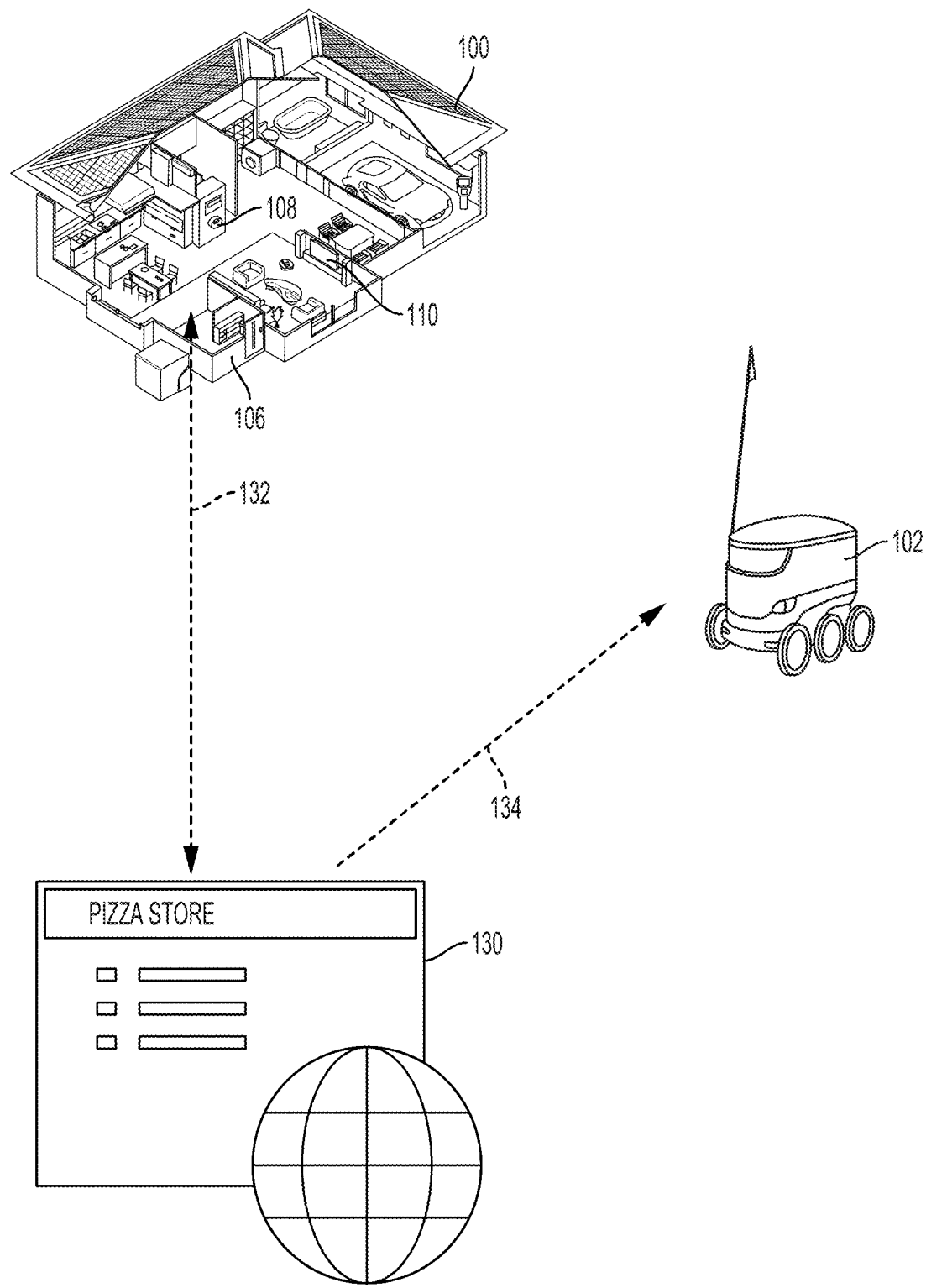

The token may be transmitted to the robot 102 prior to the robot's 102 arrival. FIG. 1C illustrates an example of transmitting a token to the robot 102 according to aspects of the present disclosure. In the example of FIG. 1C, an occupant of the home 100 may establish a network connection 132 with a vendor, such as a pizza store 130. In this example, the network connection 132 is an Internet connection with the pizza store's 130 web site. The occupant may also call the vendor over the phone or communicate via other communication systems. Furthermore, the occupant does not need to be located at the home 100 when establishing the network connection 132. For example, the occupant may be at work and may order an item for delivery at the home 100.

Upon receiving the order for the item (e.g., pizza), the pizza store 130 transmits a token to the robot 102 via a communication channel 134. The communication channel 134 may be an Internet connection or other type of connection, such as Bluetooth, NFC, etc. The pizza store 130 may also transmit an authentication key (e.g., token key) to the home 100 via the network connection 132 or another connection (not shown). In another configuration, the pizza store 130 transmits both the token and the authentication key to the home 100. In this configuration, the home 100 transmits the token to the robot 102 when the robot 102 is near the home 100. The token and authentication key may be transmitted via a computing device (e.g., server) associated with the pizza store 130. The token key is used to authenticate the token.

When ordering an item, the occupant may specify one or more components 106, 108, 110 of the arrival notification system that may be activated by the robot 102. As such the token is generated based on the occupant's preferences. The occupant's preferences may be pre-defined or may be set at the time of ordering. For example, when ordering from the pizza store 130, the occupant may specify that the robot 102 may only activate the doorbell 106.

In addition to the token and authentication key, the pizza store 130 may transmit identification information and/or parcel information to the robot 102. The identification information identifies the robot's 102 source of origin (e.g., pizza store 130) and the parcel information identifies the content of the robot's 102 parcel (e.g., pizza). A corresponding key for the identification information and/or parcel information may be transmitted to the home 100 from the pizza store 130. The corresponding key may be used to authenticate the identification information and/or parcel information. As discussed herein, the robot 102 may transmit the identification information and/or parcel information to the home 100 prior to the robot's 102 arrival or after the token is authenticated by the home 100.

Figure 1D:
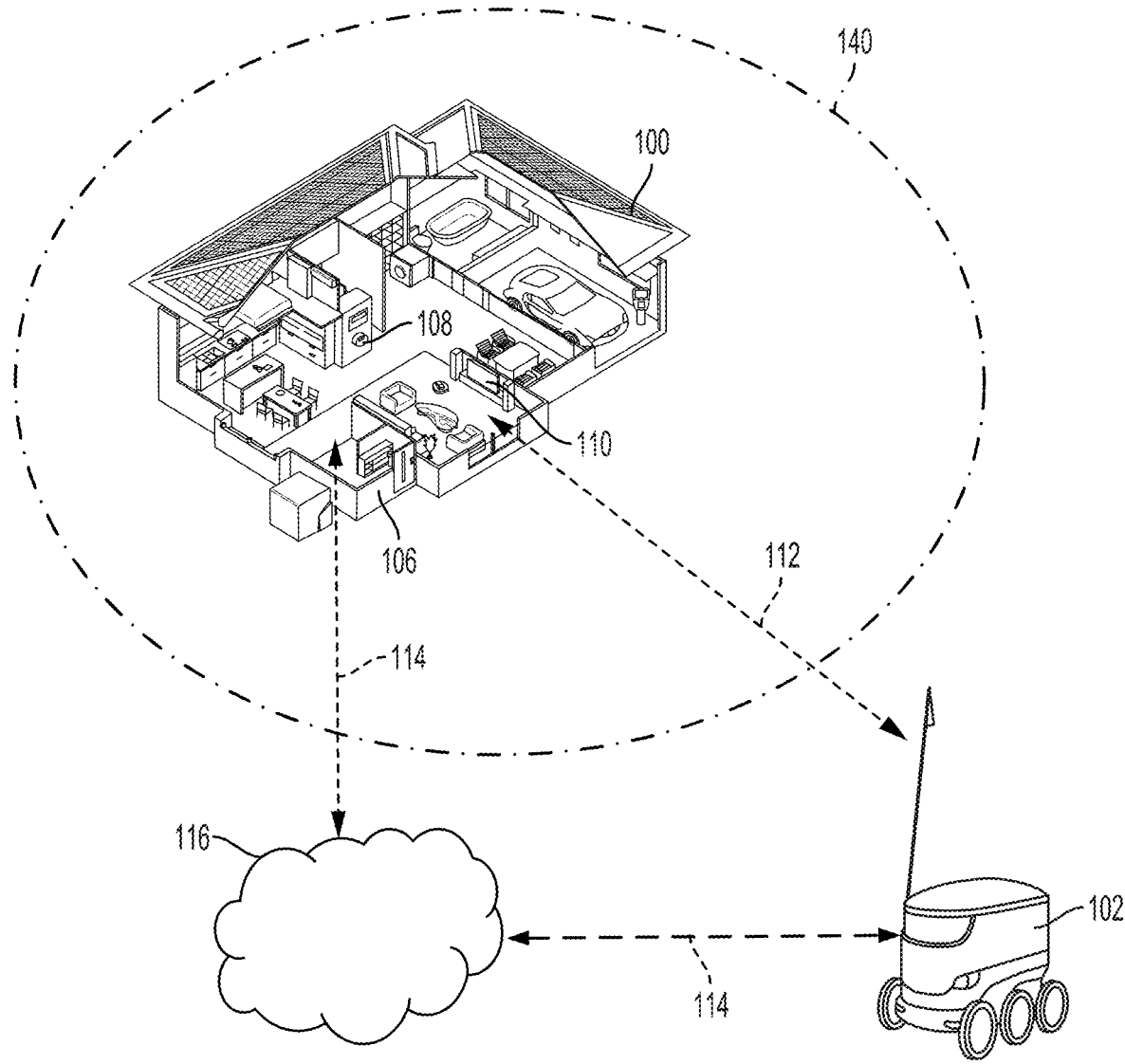

In another configuration, the token may be transmitted from the home 100 to the robot 102 when a distance between the robot 102 and the home 100 is less than a threshold. FIG. 1D illustrates an example of transmitting the token to the robot 102 according to aspects of the present disclosure. In one configuration, the robot 102 sends identification information to the home 100 when the robot 102 is within a given distance 140 to the home 100. For example, the distance 140 may be based on the robot's 102 ability to establish a direct connection 112 with the home. Still, the distance 140 may be based on other factors, such as an occupant set distance.

In the present configuration, prior to arriving at the home 100, the robot 102 transmits identification information to the home 100 via the direct connection 112 or the indirect connection 114. The identification information may indicate the robot's 102 source of origin, such as pizza store. As another example, the identification information may indicate that the robot 102 is associated with a certain delivery entity, such as the U.S. Post Office. The identification information may be transmitted as an encrypted key. The home 100 attempts to decrypt the key based on decryption information provided by various delivery entities and/or sources of origin.

In another example, the home 100 compares a stored identification key with a received identification key to verify the robot's 102 identity. In another configuration, after receiving the identification information, the home 100 contacts the delivery entity to confirm the validity of the robot 102 or other types of delivery agents. The connection to the delivery entity may be via a connection such as the Internet. Furthermore, the connection may be encrypted to prevent false notification by pranksters.

For example, a utility worker may arrive to check on the home's 100 power lines. The utility worker may provide identification information indicating the worker is from the utility company. In response, the home 100 may transmit a request for the utility company to confirm that such work is scheduled and that the utility worker is authorized to be at the home 100. Upon successfully verifying the utility worker's identity information, the home 100 may transmit a token to the utility worker. If the utility worker's identity information is not confirmed, the home 100 does not transmit a token. Furthermore, the home 100 may enable security measures, such as sounding an alarm, notifying authorities, enabling a digital safety parameter, etc.

In addition to, or alternate from transmitting the identification information, the robot 102 may transmit parcel information to the home 100 via the direct connection 112 or the indirect connection 114. The parcel information indicates the content of the parcel that is carried by the robot 102, such as pizza. The parcel information may be transmitted as an encrypted key. The home 100 attempts to decrypt the parcel information based on decryption information provided by the supplier when the occupant purchased the parcel. In another example, the home 100 compares stored parcel information with received parcel information to verify the parcel.

As discussed above, the robot 102 may determine that its distance to the home 100 is less than a threshold. The determination may be based on one or more sensors of the robot 102. For example, the robot 102 may use a positioning sensor (e.g., GPS) to determine its location. In another example, the robot 102 may use one or more vision sensors, such as a light detection and ranging (LIDAR) sensor, a radio detection and ranging (RADAR) sensor, and/or other vision sensors to identify that it is within a given distance of the home.

In another configuration, the home 100 determines that the robot 102 is within a given distance of the home 100. The home 100 may use one or more vision sensors, such as a LIDAR sensor, a RADAR sensor, and/or other vision sensors to identify the robot 102. In another example, a transceiver of the home 100 may identify beacon signals transmitted by the robot 102. Upon detecting the robot 102, the home 100 may transmit a request, via the direct connection 112 or the indirect connection 114, requesting the identification information and/or the parcel information.

Upon successfully verifying the robot's 102 identity information and/or parcel information, the home transmits a token to the robot 102. The robot 102 then transmits the token back to the home 100 via the direct connection 112 or the indirect connection 114. As discussed herein, one or more components 106, 108, 110 of the arrival notification system may be activated once the token is authenticated. Aspects of the present disclosure are not limited to the robot 102 as the autonomous agent, other types of non-autonomous and autonomous agents are contemplated.

Figure 2:
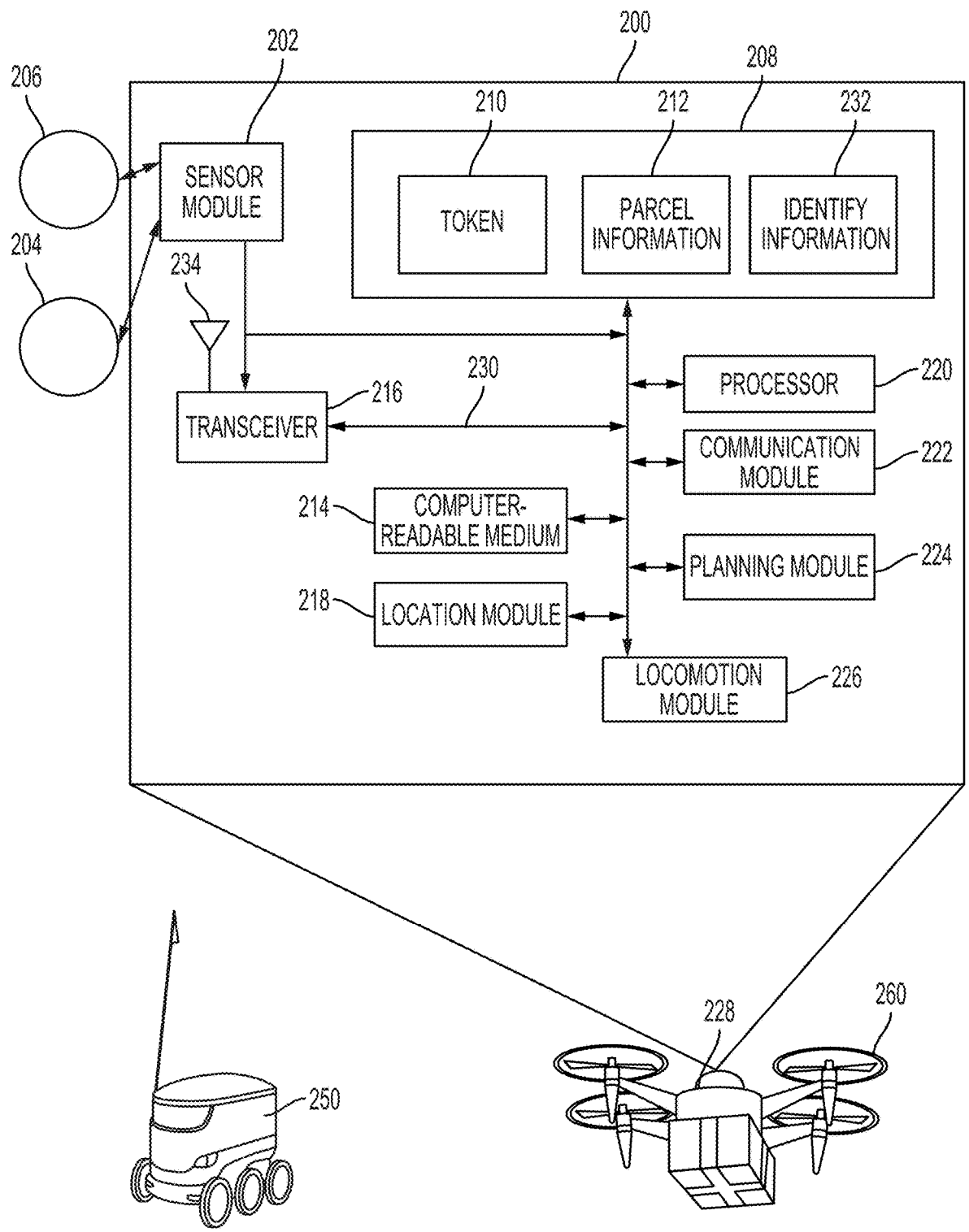
FIG. 2 is a diagram illustrating an example of a hardware implementation for a delivery agent according to aspects of the present disclosure.

FIG. 2 is a diagram illustrating an example of a hardware implementation for delivery system 200 according to aspects of the present disclosure. The delivery system 200 may be a component of a vehicle, an autonomous or semi-autonomous robotic device, a mobile device, or other device. For example, as shown in FIG. 2, the delivery system 200 is a component of an autonomous agent 228. The delivery system 200 may be integrated with a delivery agent or integrated with a device used by a delivery agent. The delivery system 200 is not limited to the autonomous agent 228 shown in FIG. 2, other types of autonomous agents, such as a vehicular robot 250, and non-autonomous agents, such as a human, are contemplated.

The delivery system 200 may be implemented with a bus architecture, represented generally by a bus 230. The bus 230 may include any number of interconnecting buses and bridges depending on the specific application of the delivery system 200 and the overall design constraints. The bus 230 links together various circuits including one or more processors and/or hardware modules, represented by a processor 220, a communication module 222, a location module 218, a sensor module 202, a locomotion module 226, a memory 208, a planning module 224, and a computer-readable medium 214. The bus 230 may also link various other circuits such as timing sources, peripherals, voltage regulators, and power management circuits, which are well known in the art, and therefore, will not be described any further.

The delivery system 200 includes a transceiver 216 coupled to the processor 220, the sensor module 202, the memory 208, the communication module 222, the location module 218, the locomotion module 226, the planning module 224, and the computer-readable medium 214. The transceiver 216 may be coupled to one or more antennae 234. That is, in some cases, such as for a laser communication, the transceiver 216 may not include an antennae 234. The transceiver 216 communicates with various other devices over a transmission medium. For example, the transceiver 216 may receive commands via transmissions from a user or a remote device. As another example, the transceiver 216 may transmit the token 210 to a delivery location (not shown). The delivery system 200 is not limited to one transceiver 216, as different transceivers 216 may be specified based on a type of communication (e.g., cellular, WiFi, Bluetooth™) used by the delivery system 200.

The delivery system 200 includes the processor 220 coupled to the computer-readable medium 214. The processor 220 performs processing, including the execution of software stored on the computer-readable medium 214 providing functionality according to the disclosure. The software, when executed by the processor 220, causes the delivery system 200 to perform the various functions described for a particular device, such as the autonomous agent 228, or any of the modules 202, 208, 214, 216, 218, 220, 222, 224, 226. The computer-readable medium 214 may also be used for storing data that is manipulated by the processor 220 when executing the software.

The sensor module 202 may be used to obtain measurements via different sensors, such as a first sensor 206 and a second sensor 204. The first sensor 206 may be a vision sensor, such as a stereoscopic camera or an RGB camera, for capturing 2D images. The second sensor 204 may be a ranging sensor, such as a LIDAR sensor or a RADAR sensor. Of course, aspects of the present disclosure are not limited to the aforementioned sensors as other types of sensors, such as, for example, thermal, sonar, and/or lasers are also contemplated for either of the sensors 204, 206. The measurements of the first sensor 206 and the second sensor 204 may be processed by one or more of the processor 220, the sensor module 202, the communication module 222, the location module 218, the locomotion module 226, the planning module 224, in conjunction with the computer-readable medium 214 to implement the functionality described herein. In one configuration, the data captured by the first sensor 206 and the second sensor 204 may be transmitted to an external device via the transceiver 216. The first sensor 206 and the second sensor 204 may be coupled to the autonomous agent 228 or may be in communication with the autonomous agent 228.

The location module 218 may be used to determine a location of the autonomous agent 228. For example, the location module 218 may use GPS to determine the location of the autonomous agent 228. The communication module 222 may be used to facilitate communications via the transceiver 216. For example, the communication module 222 may be configured to provide communication capabilities via different wireless protocols, such as WiFi, long term evolution (LTE), 3G, etc. The communication module 222 may also be used to communicate with other components of the autonomous agent 228 that are not modules of the delivery system 200.

The locomotion module 226 may be used to facilitate locomotion of the autonomous agent 228. As an example, the locomotion module 226 may control movement of propellers 260 or wheels 262. As another example, the locomotion module 226 may be in communication with a power source of the autonomous agent 228, such as an engine or batteries. Of course, aspects of the present disclosure are not limited to providing locomotion via propellers and are contemplated for other types of components for providing locomotion, such as wheels, treads, fins, and/or jet engines.

The delivery system 200 also includes a planning module 224 for planning a route or controlling the locomotion of the autonomous agent 228, via the locomotion module 226. In one configuration, the planning module 224 plans a route to a delivery location. The modules may be software modules running in the processor 220, resident/stored in the computer-readable medium 214, one or more hardware modules coupled to the processor 220, or some combination thereof.

A memory 208 may be in communication with the sensor module 202, the transceiver 216, the processor 220, the communication module 222, the location module 218, the locomotion module 226, the planning module 224, and the computer-readable medium 214. In one configuration, the memory 208 stores a token 210, parcel information 212, and/or identity information 232. The token 210, parcel information 212, and/or identity information 232 may be received by the transceiver 216 from a remote device.

Based on information provided by the sensor module 202, the transceiver 216, the planning module 224, and/or the location module 218, the autonomous agent 228 determines that its distance to a location is less than a threshold. In response, the autonomous agent 228 may transmit to an arrival notification system, via the transceiver 216, an arrival notification activation request. Alternatively, the autonomous agent 228 may expressly activate one or more components of the arrival notification system. An express activation may include physically engaging a component or activating a component. Although the autonomous agent 228 may activate one or more components, the arrival notification system does not generate an output from the one or more components until a token of the autonomous agent 228 is validated.

In response to receiving the request to activate or the express activation, the arrival notification system transmits a request for a token to the autonomous agent 228. The autonomous agent 228 may retrieve the token 210 from the memory 208 and transmit the token 210 to the arrival notification system. The token 210 may also be displayed via a display device (not shown) of the autonomous agent 228. For example, the token 210 may be displayed as a bar code. Upon validating the token 210, the, arrival notification system may activate an output from one or more components of the arrival notification system.

In addition to transmitting the token 210, the autonomous agent 228 may transmit, or display, the parcel information 212 and/or the identity information 232. In another configuration, the parcel information 212 and/or the identity information 232 may be transmitted, or displayed, prior to activating one or more components of the arrival notification system. The arrival notification system may also validate the parcel information 212 and/or the identity information 232 prior to activating an output from one or more components of the arrival notification system.

Figure 3:
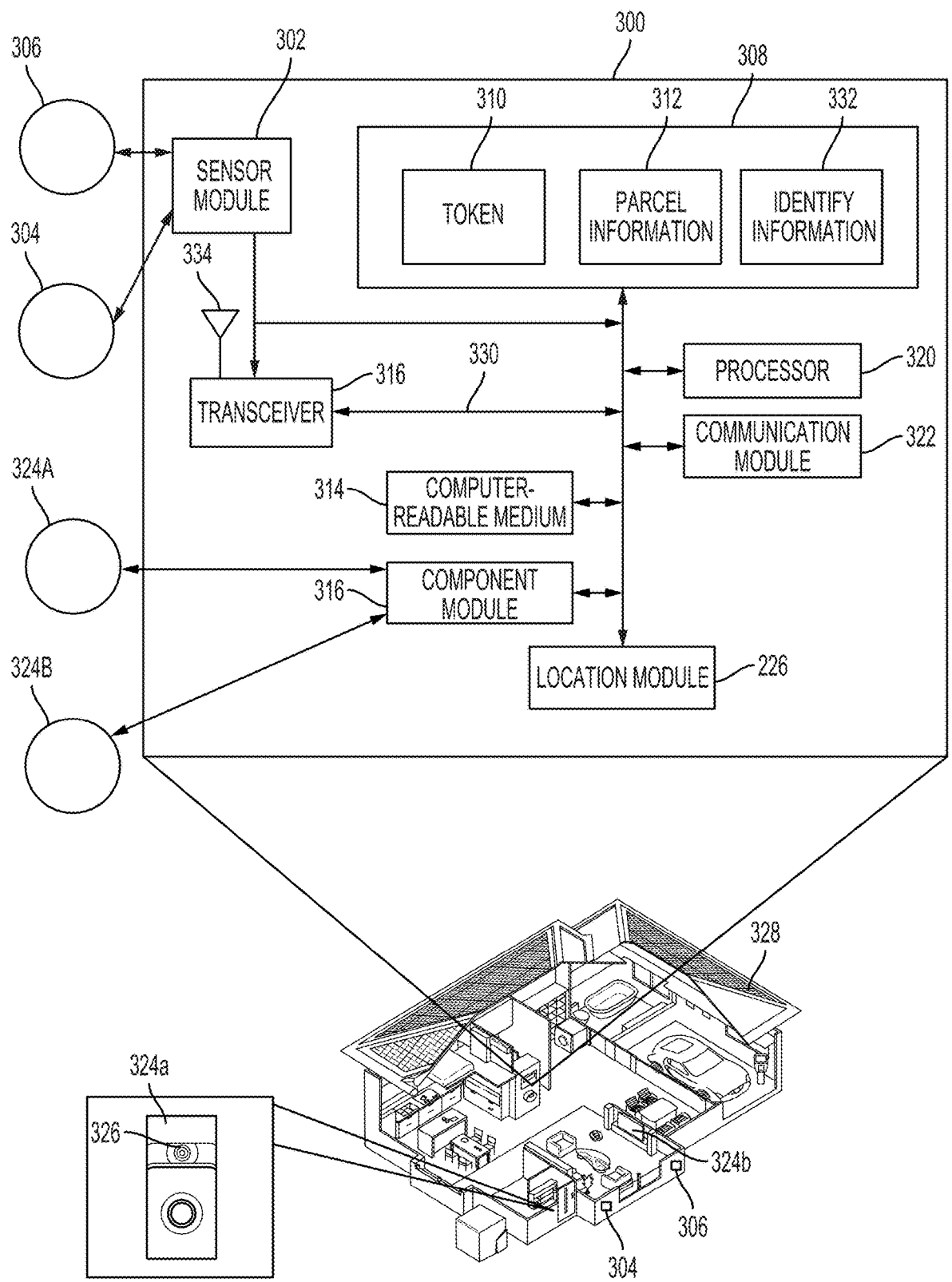
FIG. 3 is a diagram illustrating an example of a hardware implementation for an arrival notification system according to aspects of the present disclosure.

FIG. 3 is a diagram illustrating an example of a hardware implementation for an arrival notification system 300 according to aspects of the present disclosure. The arrival notification system 300 may be a component of a delivery location, such as a home 328. Of course, aspects of the present disclosure are not limited to the arrival notification system 300 being a component of the home 328, as other locations, such as an office, school, etc. are also contemplated for using the arrival notification system 300. The arrival notification system 300 may be used to activate one or more components 324a, 324b that notify an occupant of the home 328 of an arrival of a delivery agent.

The arrival notification system 300 may be implemented with a bus architecture, represented generally by a bus 330. The bus 330 may include any number of interconnecting buses and bridges depending on the specific application of the arrival notification system 300 and the overall design constraints. The bus 330 links together various circuits including one or more processors and/or hardware modules, represented by a processor 320, a memory 308, a component module 316, a communication module 322, a location module 318, a sensor module 302, and a computer-readable medium 314. The bus 330 may also link various other circuits such as timing sources, peripherals, voltage regulators, and power management circuits, which are well known in the art, and therefore, will not be described any further.

The arrival notification system 300 includes a transceiver 316 coupled to the processor 320, the sensor module 302, the memory 308, the component module 316, the communication module 322, the location module 318, and the computer-readable medium 314. The transceiver 316 may be coupled to one or more antennae 334. That is, in some cases, such as for a wired Internet connection, the transceiver 316 may not include an antennae 334. The transceiver 316 communicates with various other devices over a transmission medium. For example, the transceiver 316 may receive commands via transmissions from a user or a remote device. As another example, the transceiver 316 may transmit a token 310 to a delivery drone (not shown). The arrival notification system 300 is not limited to one transceiver 316, as different transceivers 316 may be specified based on a type of communication (e.g., cellular, WiFi, Bluetooth™) used by the arrival notification system 300.

The arrival notification system 300 includes the processor 320 coupled to the computer-readable medium 314. The processor 320 performs processing, including the execution of software stored on the computer-readable medium 314 providing functionality according to the disclosure. The software, when executed by the processor 320, causes the arrival notification system 300 to perform the various functions described for a particular device, such as the home 328, or any of the components/modules 302, 308, 314, 316, 318, 320, 322. The computer-readable medium 314 may also be used for storing data that is manipulated by the processor 320 when executing the software.

The sensor module 302 may be used to obtain measurements via different sensors, such as a first sensor 306 and a second sensor 304. The first sensor 306 may be a vision sensor, such as a stereoscopic camera or an RGB camera, for capturing 2D images. The second sensor 304 may be a ranging sensor, such as a LIDAR sensor or a RADAR sensor. Of course, aspects of the present disclosure are not limited to the aforementioned sensors as other types of sensors, such as, for example, thermal, sonar, and/or lasers are also contemplated for either of the sensors 304, 306.

The measurements of the first sensor 306 and the second sensor 304 may be processed by one or more of the processor 320, the sensor module 302, the communication module 322, the location module 318, in conjunction with the computer-readable medium 314 to implement the functionality described herein. In one configuration, the data captured by the first sensor 306 and the second sensor 304 may be transmitted to an external device via the transceiver 316. The sensors 304, 306 may be defined on an exterior of the home 328. In one example, the sensors 304, 306 may be used to detect a delivery drone within a vicinity of the home 328.

The location module 318 may be used to determine a location of the home 328. For example, the location module 318 may use GPS to determine the location of the home 328 and/or the delivery drone. In this example, location module 318 may receive the delivery drone's location and determine if the delivery drone's distance is less than a threshold. The communication module 322 may be used to facilitate communications via the transceiver 316. For example, the communication module 322 may be configured to provide communication capabilities via different wireless protocols, such as WiFi, long term evolution (LTE), 3G, etc. The communication module 322 may also be used to communicate with other components of the home 328 that are not modules of the arrival notification system 300.

A memory 308 may be in communication with the sensor module 302, the transceiver 316, the processor 320, the component module 316, the communication module 322, the location module 318, and the computer-readable medium 314. In one configuration, the memory 308 stores a token 310, parcel information 312, and/or identity information 332. The token 310 may be transmitted to a delivery drone when the delivery drone has requested the token 310. The token 310 may also be a token key used to validate a token received from the delivery drone. The parcel information 312 and/or identity information 332 may be used to validate parcel information and/or identity information received from a delivery drone. The token 310, parcel information 312, and/or identity information 332 may be received via the transceiver 316.

The arrival notification system 300 may include one or more arrival notification components 324a, 324b. For example, the arrival notification system 300 may include a camera doorbell 324a and a television 324b. Of course, the arrival notification system 300 may include additional arrival notification components and is not limited to the arrival notification components 324a, 324b of FIG. 3. The arrival notification components 324a, 324b may output an audio and/or video notification, via an associated output device, when a token of a delivery drone is validated.

In one configuration, the arrival notification system 300 receives an arrival notification activation request from a delivery drone. Alternatively, one or more components 324*a*, 324*b* of the arrival notification system 300 may be expressly activated. Although the delivery drone may activate one or more components 324*a*, 324*b*, the arrival notification system 300 does not generate an output from the one or more components until a token of the delivery drone is validated.

In response to receiving the request to activate or the express activation, the arrival notification system 300 transmits a request for a token to the delivery drone. In response to the request for the token, the delivery drone may transmit, or display, the token to the arrival notification system 300. The arrival notification system 300 may receive the token via the transceiver 316. Additionally, or alternatively, the arrival notification system 300 may scan the token via a scanner, such as a video camera 326 of a video doorbell 324*a*. The received token may be validated with the token 310 stored in the memory 308. Upon validating the token, the arrival notification system 300 may activate an output from one or more components 324*a*, 324*b* of the arrival notification system 300.

In addition to transmitting the token 310, the delivery drone may transmit, or display, the parcel information 312 and/or the identity information 332. In another configuration, the parcel information 312 and/or the identity information 332 may be transmitted, or displayed, prior to activating one or more components of the arrival notification system. The arrival notification system may also validate the parcel information 312 and/or the identity information 332 prior to activating an output from one or more components of the arrival notification system.

Figure 4:
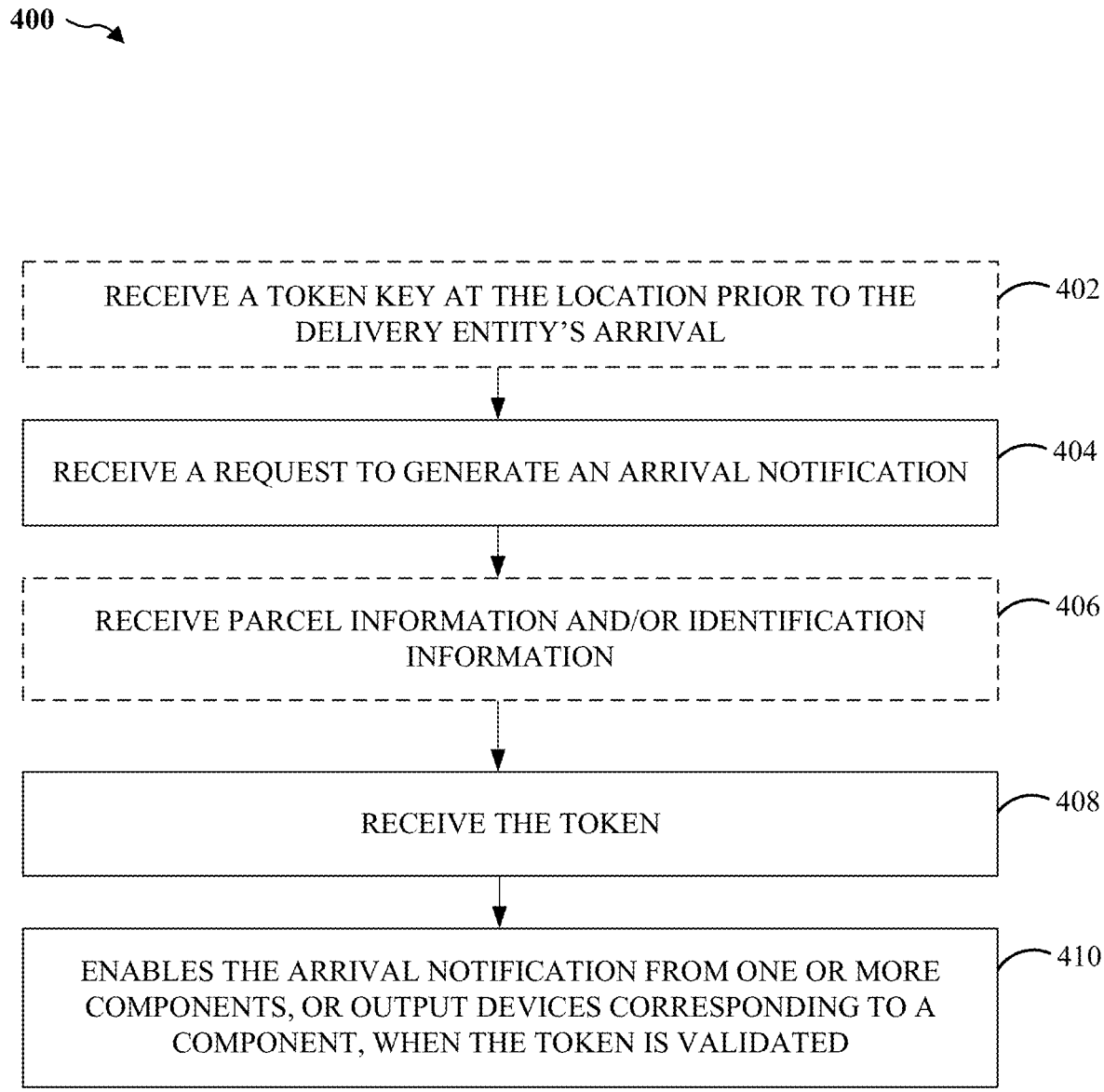
FIG. 4 illustrates a flow diagram for a method for operating an arrival notification system at a location according to aspects of the present disclosure.

FIG. 4 illustrates a method 400 for operating an arrival notification system at a location according to an aspect of the present disclosure. The location may be any type of location, such as a home, office, school, etc. In an optional configuration, at block 402, a token key is received prior to an agent's arrival. The token key may be received from the agent or an organization corresponding to the agent. For example, if an occupant of the location orders a pizza, the token key may be provided to the location, via a communication channel, upon ordering the pizza. The token key may be used to validate the token. For example, the token key may decrypt the token and the decrypted token may be compared to a master token. In another example, the token is compared with the token key. The token is validated if the token matches the token key. The token and the token key may only be used once.

At block 404, the arrival notification system receives a request to generate an arrival notification. The request may be received from an autonomous or non-autonomous agent. The agent may be an autonomous or semi-autonomous robotic device, such as a robot or a drone. In another example, the agent is a human. The agent may be delivering an item, such as a parcel or food. In another example, the agent is a service provider, such as a house keeper or gardener. In yet another example, the agent arrives at the location to pick up an item, such as dirty laundry.

In an optional configuration, at block 406, the arrival notification system receives parcel information and/or identification information. The parcel information provides information of the item being delivered. For example, if the agent is delivering pizza, the parcel information may be "pizza." The identification information provides the source of origin for the item or service. For example, if the agent is delivering pizza, the identification information may be "pizza store" (e.g., the pizza store from which the pizza was ordered). As another example, if the agent is providing housekeeping services, the identification information may be "house keeper."

The arrival notification system may validate the parcel information and/or identification information based on previously stored data. For example, upon ordering an item, the parcel information and/or identification information is stored for the item along with an estimated delivery time/date. The parcel information and/or identification information may be validated based on the stored parcel information and/or identification information corresponding to the item. The estimated delivery time/date may also be used to validate the parcel information and/or identification information.

The arrival notification system may also communicate with the identified delivery entity/vendor (e.g. U.S. Postal Service, utility company, pizza store) to validate the parcel information and/or identification information. For example, for a pizza delivery, upon receiving the identification information and/or parcel information, the arrival notification system may establish an Internet connection with the corresponding pizza store. The arrival notification system may request the pizza store to verify the agents identity and/or whether the agent's visit is valid.

In one configuration, the arrival notification system validates a delivery item via one or more sensors. For example, a camera may be used to obtain a visual confirmation of the pizza. As another example, an aroma sensor may confirm that the package smells like pizza. In yet another example, an x-ray scanner may scan the content of a parcel to verify the validity of the parcel identification information.

Additionally, the identity of an agent may be validated via a biometric scan. For example, a retinal scanner or fingerprint scanner may be used to obtain biometric information of a human agent. The obtained biometric information may be compared with stored biometric information to validate the obtained biometric information. Alternatively, the obtained biometric information may be transmitted to an originating entity to verify the obtained biometric information.

In response to receiving the request and then validating the parcel information and/or identification information, the arrival notification system may transmit the token to the agent. The token may be generated by the arrival notification system or by an organization corresponding to the agent. In another example, prior to receiving the request, the token is transmitted to the agent upon validating the parcel information and/or identification information. In yet another example, the token is provided to the agent by an organization corresponding to the agent (e.g., a service/item provider). For example, if the occupant of the location orders a pizza, the pizza store provides the token to the delivery agent. In this example, as previously discussed, the pizza store may also transmit the token key to the arrival notification system of the location.

At block 408, the arrival notification system receives the token from the agent. The token may be received in response to receiving the request to activate the component. The token may be requested by the arrival notification system. Alternatively, the agent may transmit the token with the request or subsequent to the request. The token may be wirelessly transmitted to the arrival notification system via a wireless connection.

In another example, the token may be displayed to a scanner of the arrival notification system. For example, an agent may include a display screen and the token may be displayed as a barcode on the display screen. In another example, a delivery person may carry a mobile device and the token may be displayed as a barcode on the display screen. The barcode may be scanned via a scanner of the arrival notification system. For example, a video camera of a video doorbell may scan the barcode. A message, such as a visual or audio output, may prompt the delivery agent to provide the barcode to the scanner.

At block 410, the arrival notification system enables the arrival notification from one or more components, or output devices corresponding to a component, when the token is validated. The components may be a doorbell, a television, a light, a home assistant, a mobile device, etc. That is, the component is a device that may generate a visual and/or an audio output. In some cases, such as the doorbell, the component is associated with an output device that generates a notification. The selected component and type of output may be defined by a user. For example, the user may select specific components and specific sounds or visual display to accompany specific types of arrivals. In this example, a pizza delivery notification may be different from a laundry pick up notification.

The output may be an audio and/or video output from the component indicating the arrival of the parcel information and/or identification information. For example, the output may be an audio output of "delivery of pizza from the pizza store has arrived." In another example, the output may be the doorbell chime. The output is not activated if the token is not valid.

As discussed herein, aspects of the present disclosure are directed to validating an autonomous or non-autonomous agent that has requested to activate an arrival notification systems. Aspects of the present disclosure reduce unwanted arrival notifications while also customizing the desired arrival notifications. Furthermore, aspects of the present disclosure prevent arrival notifications from pranksters.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system.

By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium.

Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method performed by a device, comprising:
   transmitting, from the device to an arrival notification system of an arrival location, a first message indicating the device intends to arrive at the arrival location;
   transmitting a token from the device to the arrival notification system, the token transmitted in the first message or a second message distinct from the first message;
   receiving a third message indicating the arrival notification system validated the token; and
   navigating to the arrival location in response to receiving the third message.

2. The method of claim 1, in which the first message comprises at least one of a request to generate an arrival notification at the arrival location, parcel information, identification information, or a combination thereof.

3. The method of claim 1, in which the device is an autonomous robotic device.

4. The method of claim 1, further comprising transmitting the first message via a wireless transmission or a visual output.

5. The method of claim 1, further comprising receiving the token from a vendor or a delivery entity prior to transmitting the first message.

6. The method of claim 1, further comprising transmitting the first message when a distance between a location of the device and the arrival location is less than a threshold.

7. The method of claim 1, further comprising:
identifying an arrival notification device of the arrival location based on the token; and
engaging the identified arrival notification device to generate an arrival notification, the arrival notification device engaged upon arriving at the arrival location.

8. A device, comprising:
a memory;
a processor coupled to the memory; and
instructions stored in the memory and operable, when executed by the processor, to cause the device:
to transmit, to an arrival notification system of an arrival location, a first message indicating the device intends to arrive at the arrival location;
to transmit a token to the arrival notification system, the token transmitted in the first message or a second message distinct from the first message;
to receive a third message indicating the arrival notification system validated the token; and
to navigate to the arrival location in response to receiving the third message.

9. The device of claim 8, in which the first message comprises at least one of a request to generate an arrival notification at the arrival location, parcel information, identification information, or a combination thereof.

10. The device of claim 8, in which the device is an autonomous robotic device.

11. The device of claim 8, in which the instructions further cause the device to transmit the first message via a wireless transmission or a visual output.

12. The device of claim 8, in which the instructions further cause the device to receive the token from a vendor or a delivery entity prior to transmitting the first message.

13. The device of claim 8, in which the instructions further cause the device to transmit the first message when a distance between a location of the device and the arrival location is less than a threshold.

14. The device of claim 8, in which the instructions further cause the device:
to identify an arrival notification device of the arrival location based on the token; and
to engage the identified arrival notification device to generate an arrival notification, the arrival notification device engaged upon arriving at the arrival location.

15. A non-transitory computer-readable medium having program code recorded thereon for a device, the program code executed by a processor and comprising:
program code to transmit, from the device to an arrival notification system of an arrival location, a first message indicating the device intends to arrive at the arrival location;
to transmit a token from the device to the arrival notification system, the token transmitted in the first message or a second message distinct from the first message;
to receive a third message indicating the arrival notification system validated the token; and
to navigate to the arrival location in response to receiving the third message.

16. The non-transitory computer-readable medium of claim 15, in which the first message comprises at least one of a request to generate an arrival notification at the arrival location, parcel information, identification information, or a combination thereof.

17. The non-transitory computer-readable medium of claim 15, in which the program code further comprises program code to transmit the first message via a wireless transmission or a visual output.

18. The non-transitory computer-readable medium of claim 15, in which the program code further comprises program code to receive the token from a vendor or a delivery entity prior to transmitting the first message.

19. The non-transitory computer-readable medium of claim 15, in which the program code further comprises program code to transmit the first message when a distance between a location of the device and the arrival location is less than a threshold.

20. The non-transitory computer-readable medium of claim 15, in which the program code further comprises:
program code to identify an arrival notification device of the arrival location based on the token; and
program code to engage the identified arrival notification device to generate an arrival notification, the arrival notification device engaged upon arriving at the arrival location.

* * * * *